(12) United States Patent
Sheasley et al.

(10) Patent No.: US 8,741,094 B2
(45) Date of Patent: Jun. 3, 2014

(54) HANDLING LAYER AND ADHESIVE PARTS FORMED THEREWITH

(75) Inventors: David Sheasley, Rochester, MI (US); Christopher Hable, Romeo, MI (US); Keith Madaus, Richmond, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 13/353,748

(22) Filed: Jan. 19, 2012

(65) Prior Publication Data

US 2012/0111488 A1 May 10, 2012

Related U.S. Application Data

(63) Continuation of application No. 11/847,565, filed on Aug. 30, 2007, now Pat. No. 8,105,460.

(60) Provisional application No. 60/824,991, filed on Sep. 8, 2006.

(51) Int. Cl.
*B60J 10/00* (2006.01)
*B29C 65/00* (2006.01)
*B32B 37/00* (2006.01)
*C08J 5/00* (2006.01)
*C04B 37/00* (2006.01)

(52) U.S. Cl.
USPC .................. 156/325; 156/221; 156/307.1

(58) Field of Classification Search
USPC ...................... 156/221, 307.1, 325
See application file for complete search history.

(56) References Cited

U.S. PATENT DOCUMENTS

| | | | |
|---|---|---|---|
| 3,640,906 A | 2/1972 | Wojcik | |
| 3,872,600 A | 3/1975 | Siminsky | |
| 3,985,703 A | 10/1976 | Ferry et al. | |
| 4,588,419 A | 5/1986 | Caul et al. | |
| 4,728,544 A | 3/1988 | Asoshina et al. | |
| 4,852,754 A | 8/1989 | Holdsworth et al. | |
| 5,045,141 A | 9/1991 | Salensky et al. | |
| 5,213,391 A | 5/1993 | Takagi | |
| 5,218,063 A | 6/1993 | Kimball | |
| 5,274,006 A | 12/1993 | Kagoshima et al. | |
| 5,275,853 A | 1/1994 | Silvis et al. | |
| 5,605,717 A | 2/1997 | Simmons et al. | |
| 5,962,093 A | 10/1999 | White et al. | |
| 5,985,435 A | 11/1999 | Czaplicki et al. | |
| 6,015,865 A | 1/2000 | Blank et al. | |
| 6,111,015 A * | 8/2000 | Eldin et al. | 525/65 |
| 6,136,732 A | 10/2000 | Patel | |

(Continued)

FOREIGN PATENT DOCUMENTS

| | | |
|---|---|---|
| CA | 2524783 A1 | 11/2004 |
| CN | 1 798 820 B | 9/2010 |

(Continued)

OTHER PUBLICATIONS

Co-Pending German Patent Application No. 07041865.7, filed Sep. 4, 2007; Published as DE 10 2007 041 865 A1 on Mar. 27, 2008.

(Continued)

*Primary Examiner* — Michael Orlando
(74) *Attorney, Agent, or Firm* — The Dobrusin Law Firm, PC

(57) ABSTRACT

A handling layer and adhesive parts having the handling layer are formed according to the present invention along with used therefore.

19 Claims, 1 Drawing Sheet

(56) References Cited

U.S. PATENT DOCUMENTS

| | | |
|---|---|---|
| 6,174,932 B1 | 1/2001 | Pachl et al. |
| 6,263,635 B1 | 7/2001 | Czaplicki |
| 6,296,298 B1 | 10/2001 | Barz |
| 6,311,452 B1 | 11/2001 | Barz et al. |
| 6,358,584 B1 | 3/2002 | Czaplicki |
| 6,419,305 B1 | 7/2002 | Larsen |
| 6,431,546 B1 | 8/2002 | Keller |
| 6,431,549 B1 | 8/2002 | Hill et al. |
| 6,455,116 B1 | 9/2002 | Xia et al. |
| 6,467,834 B1 | 10/2002 | Barz et al. |
| 6,474,723 B2 | 11/2002 | Czaplicki et al. |
| 6,482,486 B1 | 11/2002 | Czaplicki et al. |
| 6,528,546 B2 | 3/2003 | Lee et al. |
| 6,573,309 B1 | 6/2003 | Reitenbach et al. |
| 6,660,086 B1 | 12/2003 | Prince et al. |
| 6,668,457 B1 | 12/2003 | Czaplicki |
| 6,740,067 B2 | 5/2004 | Leise, Jr. et al. |
| 6,811,864 B2 | 11/2004 | Czaplicki et al. |
| 6,846,559 B2 | 1/2005 | Czaplicki et al. |
| 6,884,854 B2 | 4/2005 | Schoenfeld et al. |
| 6,887,914 B2 | 5/2005 | Czaplicki et al. |
| 6,911,109 B2 | 6/2005 | Giroux et al. |
| 7,125,461 B2 | 10/2006 | Czaplicki et al. |
| 7,267,738 B2 | 9/2007 | Czaplicki et al. |
| 2002/0013389 A1 | 1/2002 | Taylor et al. |
| 2002/0024233 A1 | 2/2002 | Kleino |
| 2002/0068139 A1 | 6/2002 | Polak et al. |
| 2002/0076566 A1 | 6/2002 | Brandys et al. |
| 2003/0039792 A1 | 2/2003 | Hable et al. |
| 2003/0042056 A1 | 3/2003 | Schneider et al. |
| 2003/0057737 A1 | 3/2003 | Bock et al. |
| 2003/0069335 A1 | 4/2003 | Czaplicki et al. |
| 2003/0090129 A1 | 5/2003 | Riley et al. |
| 2003/0176128 A1 | 9/2003 | Czaplicki et al. |
| 2003/0183317 A1 | 10/2003 | Czaplicki et al. |
| 2003/0186049 A1 | 10/2003 | Czaplicki et al. |
| 2004/0033344 A1* | 2/2004 | Czaplicki et al. ............. 428/202 |
| 2004/0076831 A1* | 4/2004 | Hable et al. .................. 428/413 |
| 2004/0084141 A1 | 5/2004 | Czaplicki et al. |
| 2004/0204551 A1 | 10/2004 | Czaplicki et al. |
| 2004/0221953 A1* | 11/2004 | Czaplicki et al. ............. 156/293 |
| 2005/0217785 A1 | 10/2005 | Hable et al. |
| 2008/0029200 A1 | 2/2008 | Sheasley |
| 2008/0105992 A1 | 5/2008 | Walker et al. |
| 2008/0254214 A1 | 10/2008 | Kassa et al. |
| 2008/0308212 A1 | 12/2008 | Sheasley et al. |

FOREIGN PATENT DOCUMENTS

| | | |
|---|---|---|
| DE | 27 19 779 A | 1/1978 |
| DE | 3 640 906 A1 | 6/1988 |
| DE | 60 2004 007 787 T2 | 6/2008 |
| EP | 0 360 214 A2 | 3/1990 |
| EP | 1 126 001 A2 | 8/2001 |
| EP | 1 391 250 A2 | 2/2004 |
| EP | 1 620 521 A2 | 7/2007 |
| JP | 56-118816 A | 9/1981 |
| JP | 57-46810 A | 3/1982 |
| JP | 3-247446 A | 11/1991 |
| JP | 4-59819 A | 2/1992 |
| JP | 9-249730 A | 9/1997 |
| JP | 10-139981 A | 5/1998 |
| JP | 2000-170736 A | 6/2000 |
| KR | 2001-0071695 | 7/2001 |
| MX | PA05011954 A | 2/2006 |
| WO | 93/05103 A1 | 3/1993 |
| WO | 98/06601 A1 | 2/1998 |
| WO | 00/10802 A1 | 3/2000 |
| WO | 01/19667 A1 | 3/2001 |
| WO | 01/46303 A2 | 6/2001 |
| WO | 02/26551 A1 | 4/2002 |
| WO | 2004/101349 A2 | 11/2004 |
| WO | 2008/157129 A1 | 12/2008 |

OTHER PUBLICATIONS

Co-Pending U.S. Appl. No. 12/136,333, filed Jun. 10, 2008; Published as 2008/308212 on Dec. 18, 2008.

Co-Pending PCT Patent Application No, US08/66413, filed Jun. 10, 2008; Published as WO2008/157129 A1 on Dec. 24, 2008.

Co-Pending Patent Application No, 11/871,523, filed Oct. 12, 2007; Published as 2008/254214 on Oct. 16, 2008.

Plastics Technology, "Keeping-Up with Materials, Newest Barrier Resin is Thermoplastic Epoxy", Jan. 2000.

Born et al. "Structural Bonding in Automotive Applications" Henkel Technologies Automotive, 2004.

Hopton et al. "Application of Structural Reinforcing Material to Improve Vehicle NVH Charachteristics" SAE Technical Paper Series, 1999.

Lilley et al. "A Comparison of NVH Treatments for Vehicle Floorplan Applications," SAE Technical Paper Series, 2001.

Mansour et al. "Optimal Bonding Thickness for Vehicle Stiffness," SAE Technical Paper Series, 2001.

* cited by examiner

US 8,741,094 B2

HANDLING LAYER AND ADHESIVE PARTS FORMED THEREWITH

CLAIM OF PRIORITY

The present application claims the benefit of the priority of U.S. application Ser. No. 11/847,565, filed Aug. 30, 2007 (now U.S. Pat. No. 8,105,460), and U.S. Provisional Application Ser. No. 60/824,991 filed Sep. 8, 2006, the contents of which are incorporated by reference herein.

FIELD OF THE INVENTION

The present invention relates to a handling layer, an adhesive part formed with the handling layer and a process for forming and/or using the layer the part or both.

BACKGROUND OF THE INVENTION

For many years, industry has been concerned with designing and providing adhesive materials for providing baffling, sealing, noise/vibration reduction, reinforcement, structural attachment or the like to articles of manufacture such as automotive vehicles. In certain instances, it can be desirable to apply these adhesive materials as pre-formed parts or masses such as strips, tapes or the like. However, these masses of adhesive material can be tacky and can undesirably adhere to persons, clothing, machines or other objects prior to or during application of the adhesive materials to an article of manufacture. Moreover, these masses of adhesive material can also undesirably deform (e.g., stretch) prior to or during application thereof, particularly in situations where the masses of adhesive material are relatively compliant or flowable. Thus, it is generally desirable to provide these adhesive material masses with at least one relatively non-tacky surface for handling purposes and/or to provide some dimensional stability to the masses and either or both are preferably accomplished without significantly adversely altering adhesive properties of the masses. As such, the present invention provides a layer (e.g., a film) for use with adhesive materials wherein the layer is substantially non-tacky and/or the layer provides a degree of dimensional stability to the adhesive material.

SUMMARY OF THE INVENTION

Accordingly, the present invention provides a handling layer, an adhesive material with a handling layer, adhesive parts and method of forming and using the same. Typically, the handling layer is applied to the adhesive material to form an adhesive part. Moreover, it is preferably for the handling layer to at least assist the adhesive material in maintaining dimensional stability. The handling layer can include, amongst other ingredients, epoxy resin, epoxy/elastomer adduct, elastomer or any combination thereof. When employed, it is preferable for a substantial portion of the epoxy resin, the epoxy/elastomer adduct or both to be solid. The adhesive material is typically activatable to cure and/or crosslink.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

Figure 1:
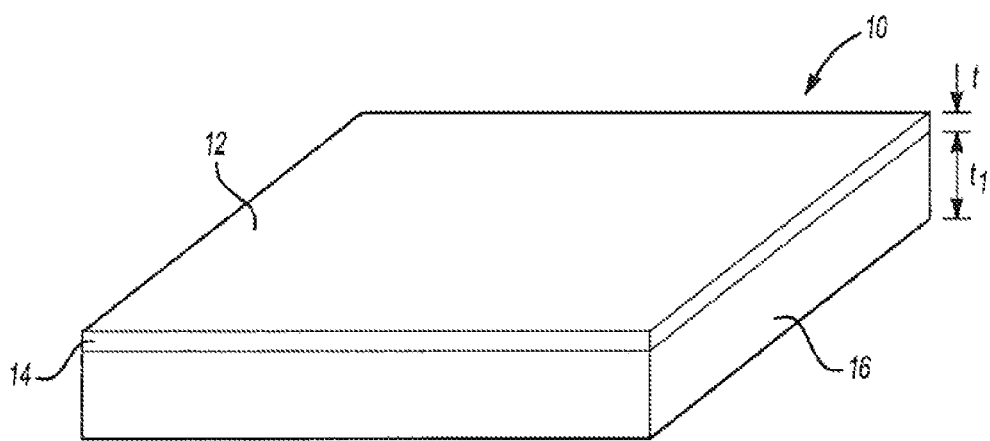
FIG. 1 illustrates an exemplary part formed in accordance with the present invention.

The present invention is predicated upon the provision of a handling layer, adhesive parts formed with the handling layer and a process of forming and/or using the handling layer, the adhesive parts or both. The handling layer is typically substantially non-tacky and it is typically desirable for the handling layer to be relatively dimensionally stable. The handling layer can be employed in conjunction with a variety of different adhesive materials, but has been found particularly useful when employed in conjunction with activatable adhesive materials. As used herein, the term activatable is used to refer to adhesive materials that melt, flow, wet, cure (e.g., thermoset and/or harden), expand (e.g., foam) or any combination thereof due to chemical reaction, exposure to an ambient condition or external stimulus (e.g., heat, radiation, moisture), combinations thereof or the like and can additionally be used to describe the handling layer. The parts formed by the present invention can be applied to members or substrates of components of various articles of manufacture such as boats, trains, buildings, appliances, homes, furniture or the like. It has been found, however, that the parts are particularly suitable for application to members of automotive vehicles or other transportation vehicles. Generally, it is contemplated that the parts may be applied to various members such as members that are part of a body, a pillar, a roof, an underbody, a frame, an engine, a hood, a trunk, a bumper, combinations thereof or the like of an automotive vehicle. It is also contemplated that the adhesive material may be applied for purposes such as adhesion, vibration damping, baffling, sealing, reinforcement, structural bonding, combinations thereof or the like. It is still further contemplated that the parts may be applied to a carrier for forming a reinforcement, a baffle, a seal, a combination thereof or the like and then applied to an article of manufacture such as an automotive vehicle.

The handling layer is typically comprised of at least one, but preferably any combination of two or more of the following:
  i. epoxy resin, a substantial portion of which is preferably a solid epoxy resin, a multi-functional resin or both;
  ii. elastomer containing adduct, a substantial portion of which is also preferably a solid and is preferably an epoxy/elastomer adduct;
  iii. an elastomer, a substantial portion of which is also preferably a solid;
  iv. impact modifier;
  v. thermoplastic resin;
  vi. curing agent; and/or
  vii. filler.

Epoxy Resin

Epoxy resin is used herein to mean any of the conventional dimeric, oligomeric or polymeric epoxy materials containing at least one epoxy functional group. The polymer-based materials may be epoxy containing materials having one or more oxirane rings polymerizable by a ring opening reaction. In preferred embodiments, the handling layer includes a substantial amount of epoxy resin that is up to about 90% by weight of the handling layer. More preferably, the handling layer includes between about 30% and 80% by weight epoxy resin and still more preferably between about 50% and 70% by weight epoxy resin.

The epoxy may be aliphatic, cycloaliphatic, aromatic or the like. The epoxy resin may be supplied as one or more solid resins (e.g., epoxy resin that is solid at 23° C. and can be supplied as pellets, chunks, pieces or the like), one or more liquid (e.g., epoxy resin that is liquid at 23° C.) or a combination of solid and liquid resins. The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may or may not be modified with, for example, a polymeric additive.

In preferred embodiments, one or more of the epoxy resins employed in the adhesive material are multifunctional and/or have relatively high functionalities (e.g., epoxy functionalities). When such relatively high functionality resins are employed, it is typically desirable for at least 2%, more typically at least 5% and even possibly at least 10% of the epoxy resin to have a functionality that is greater than about 2 (e.g., about 2.6 or greater), more typically greater than about 3 (e.g., about 3.6 or greater) and still more typically greater than about 4.5 (e.g., about 5.1 or greater). Advantageously, such higher functionality can, in certain instances, provide for improved high temperature performance, improved lap shear strength or a combination thereof.

It is also generally preferable for a substantial portion of the epoxy resin to be comprised of one or more solid epoxy resins. Such one or more solid epoxy resins typically comprise at least about 50%, although possibly less, more typically at least 75%, even more typically at least 80% and still more typically at lest 93% by weight of the (or any) epoxy resin present in the handling layer. It is also contemplated that the (or any) epoxy resin of the handling layer is substantially entirely, entirely or consists essentially of solid resin such that the handling layer can be substantially or entirely without any liquid epoxy resin. Examples of suitable epoxy resins, without limitation, are sold under the trade designations DER® 661, 662, 664 or 331 and are commercially from Dow Chemical Company, Midland, Mich. and under the trade designation ARALDITE GT 7071, GT 7072, GT 7074 or 1280 ECN commercially available from Huntsman.

Elastomer-Containing Adduct

In a highly preferred embodiment, an elastomer-containing adduct is employed in the handling layer of the present invention, and preferably in a relatively high concentration (e.g., on the order of the epoxy resin). The epoxy/elastomer hybrid or reaction product (e.g., adduct) may be included in an amount of up to about 80% by weight of the adhesive material. More preferably, the elastomer-containing adduct is approximately or more exactly 7 to 70%, more preferably 20 to 60%, and even more preferably is about 20% to 35% by weight of the adhesive material. Of course, the elastomer-containing adduct may be a combination of two or more particular adducts and the adducts may be solid adducts or liquid adducts at a temperature of 23° C. or may also be combinations thereof.

The adduct itself generally includes about 1:5 to 5:1 parts of epoxy to elastomer, and more preferably about 1:3 to 3:1 parts or epoxy to elastomer. More typically, the adduct includes at least about 5%, more typically at least about 12% and even more typically at least about 18% elastomer and also typically includes not greater than about 50%, even more typically no greater than about 40% and still more typically no greater than about 35% elastomer, although higher or lower percentages are possible. The elastomer compound may be any suitable art disclosed elastomer such as a thermosetting elastomer. Exemplary elastomers include, without limitation natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. In one embodiment, recycled tire rubber is employed. Examples of additional or alternative epoxy/elastomer or other adducts suitable for use in the present invention are disclosed in U.S. Patent Publication 2004/0204551, which is incorporated herein by reference for all purposes.

The elastomer-containing adduct, when added to the handling layer preferably is added to modify structural properties of the adhesive material such as strength, toughness, stiffness, flexural modulus, or the like. Additionally, the elastomer-containing adduct may be selected to render the adhesive material more compatible with coatings such as water-borne paint or primer system or other conventional coatings.

According to one preferred embodiment, the handling layer includes a substantial portion of one or more solid adducts (i.e., solid at a temperature of about 23° C.) for assisting in improving properties such as impact strength, peel strength, combinations thereof or others. Thus, in one embodiment, it is contemplated that for all adducts in the handling layer, the one or more solid adducts typically comprise at least about 50%, although possibly less, more typically at least 75%, even more typically at least 80% and still more typically at least 93% by weight of the or any adducts present in the handling layer. It is also contemplated that the, or any adduct of the handling layer is substantially entirely, entirely or consists essentially of adduct such that the handling layer can be substantially or entirely without any liquid adduct. Examples of suitable epoxy/elastomer adduct, without limitation, are sold under the trade designation HYPOX RK8-4, commercially available from CVC Chemical.

Elastomer

Generally, the handling layer can include one or more of a variety of elastomeric materials, which may be independently admixed into the adhesive material or may be added as part of a admixture of materials. Exemplary suitable elastomers include, without limitation, natural rubber, styrene-butadiene rubber, polyisoprene, polyisobutylene, polybutadiene, isoprene-butadiene copolymer, neoprene, butyl rubber, polysulfide elastomer, acrylic elastomer, acrylonitrile elastomers (e.g., butadiene/acrylonitrile rubber), silicone rubber, polysiloxanes, polyester rubber, polyurethane rubber, diisocyanate-linked condensation elastomer, EPDM (ethylene-propylene diene rubbers), chlorosulphonated polyethylene, fluorinated hydrocarbons and the like According to one preferred embodiment, the elastomer is partially or substantially entirely (e.g., at least 80%, 90%, 95% or more) or entirely composed of a nitrile rubber (e.g., a butadiene/acrylonitrile rubber). If such a nitrile rubber is employed, the rubber preferably includes between about 10% or less and about 50% or more by weight nitrile, more preferably between about 20% and about 40% by weight nitrile and even more preferably between about 25% and about 35% by weight nitrile.

Advantageously, the elastomer can provide desired properties to the handling layer, such as toughness, flexibility or the like. When used, elastomer is typically at least about 1%, although possibly less, more typically at least about 5% and still more typically at least about 9% and possibly even at least about 12% by weight of the handling film. Moreover, when used, elastomer is also typically less than about 40%, although possibly more, more typically less than about 25% and even more typically less than about 18% by weight of the handling film. Examples of desirable elastomers are sold under the tradenames NIPOL DN 3335, commercially available from Zeon Chemicals.

Blowing Agent

One or more blowing agents may be added to the handling layer. The blowing agents may be chemical and produce inert gasses that form, as desired, an open and/or closed cellular structure within the layer or may be physical and either may be activated upon exposure to a condition such as heat, radiation, moisture, chemical reaction, combinations thereof or the like. In this manner, it may be possible to lower the density of articles fabricated from the layer. In addition, the layer expansion can help to improve sealing capability, substrate wetting ability, adhesion to a substrate, acoustic damping, combinations thereof or the like.

The blowing agent may include one or more nitrogen containing groups such as amides, amines and the like. Examples of suitable blowing agents include azodicarbonamide, dinitrosopentamethylenetetramine, 4,4,-oxy-bis-(benzenesulphonylhydrazide), trihydrazinotriazine and N,N,-dimethyl-N,N,-dinitrosoterephthalamide. Other potential blowing agents include solvent encapsulated in thermoplastic shells.

An accelerator for the blowing agents may also be provided in the handling layer. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles, hydrazides, imidazoles, ureas, combinations thereof or the like.

Amounts of blowing agents and blowing agent accelerators can vary widely within the handling layer depending upon the type of cellular structure desired, the desired amount of expansion (e.g., foaming), the desired rate of expansion, desired cure conditions and the like. Exemplary ranges for the amounts of blowing agents and blowing agent accelerators in the handling layer range from about 0.001% by weight to about 5% by weight and are preferably in the adhesive material in fractions of weight percentages when used.

In one embodiment, the present invention contemplates the omission of a blowing agent. Thus, it is possible that the handling layer will not be a foamable material. Preferably, when used, the blowing agent of the present invention is thermally activated. However, other agents may be employed for realizing activation by other means, such as moisture, radiation, or otherwise.

Curing Agent

One or more curing agents and/or curing agent accelerators may be added to the handling layer. Amounts of curing agents and curing agent accelerators can vary within the handling material depending upon the desired structural properties of the adhesive material, the desired cure conditions (e.g., manufacturing conditions) and the like. Exemplary ranges for the curing agents or curing agent accelerators present in the handling layer range from about 0.01% by weight to about 7% by weight.

Preferably, the curing agents assist the handling layer in curing by crosslinking of the epoxy containing adducts, epoxy resins (e.g., by reacting in stoichiometrically excess amounts of curing agent with the epoxide groups on the resins), other polymers or a combination thereof. It is also preferable for the curing agents to assist in thermosetting the handling layer. Useful classes of curing agents are materials selected from aliphatic or aromatic amines or their respective adducts, blocked amines, amidoamines, polyamides, cycloaliphatic amines, (e.g., anhydrides, polycarboxylic polyesters, isocyanates, phenol-based resins (such as phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as cyanoguanidine, hydrazides, sulphones (e.g., diamino diphenyl sulphone (DDS)), dicyandiamides and the like. An accelerator for the curing agents (e.g., a modified or unmodified urea such as methylene diphenyl bis urea, an imidazole or a combination thereof) may also be provided for preparing the adhesive material.

Desirable cure times can vary depending upon manufacturing processes and other factors. Moreover, such curing times can depend upon whether additional energy (e.g., heat, light, radiation) is applied to the material or whether the material is cured at room temperature. It is also contemplated that the handling layer may be, in certain embodiments, substantially or entirely without curing agents.

Filler

The handling layer may also include one or more fillers, including but not limited to particulated materials (e.g., powder), beads, microspheres, or the like. Preferably the filler includes a relatively low-density material that is generally non-reactive with the other components present in the handling layer.

Examples of fillers include silica, diatomaceous earth, glass, clay, talc, pigments, colorants, glass beads or bubbles, glass, carbon ceramic fibers, antioxidants, and the like. Such fillers, particularly clays, can assist the adhesive material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, wollastonite, pyrophyllite, sauconite, saponite, nontronite, montmorillonite or mixtures thereof. The clays may also include minor amounts of other ingredients such as carbonates, feldspars, micas and quartz. Titanium dioxide might also be employed.

One or more mineral or stone type fillers such as calcium carbonate, sodium carbonate or the like may be used as fillers. In another preferred embodiment, silicate minerals such as mica may be used as fillers.

When employed, the fillers in the handling layer can range from 2% to 40% by weight of the handling layer material. According to some embodiments, the handling layer may include from about 0.1% to about 30% by weight, and more preferably about 2% to about 20% or about 5 to about 10% by weight clays or other fillers. Powdered (e.g. about 0.01 to about 50, and more preferably about 1 to 25 micron mean particle diameter) mineral type filler or other fillers can comprise between about 1% and 70% by weight, more preferably about 3% to about 20%, and still more preferably approximately 6% by weight of the adhesive material.

It is also contemplated that the activatable material may include one or more conductive materials as filler, which can assist in weld-through of the material. Examples of such materials includes graphite, carbon-black, iron phosphide, metal particulate (e.g., pellets, shavings or the like), combinations thereof or the like. When used, such conductive material typically comprises at least about 1%, more typically at least about 3% and even more typically at least about 7% by weight of the handling layer and also typically comprise less than about 30%, more typically less that about 15% and even more typically less than about 11% by weight of the handling layer, although higher or lower amounts may be used. One exemplary desirable conductive filler is sold under the tradename FERROPHOS 2131, commercially available from OxyChem Corporation. Other desirable conductive fillers are synthetic or natural graphites and/or carbon fibers sold under the tradename ASBURY and commercially available from the Asbury Corporation. In such an embodiment, the conductive filler may be substantially the only filler or the only filler of the handling layer, but unless otherwise stated, others can be included.

Formation

Formation of the handling material or layer may be accomplished according to a variety of methodologies. Generally, ingredients of the handling layer are typically mixed in a batch type process to form a substantially homogeneous mixture. For example, the ingredients may be dispensed to a mixer (e.g., a high shear mixer) and mixed until the material of the layer is formed in a substantially homogeneous state. Preferably, the mixing takes place at a temperature between about 50° C. or lower and 250° C. or higher, more preferably between about 70° C. and about 200° C. and even more preferably between about 80° C. and about 160° C. and even possibly between about 80° C. and about 160° C. Thereafter, the material of the handling layer can be allowed to cool and typically solidify although it may cool and remain as a semi-solid or a liquid, unless otherwise stated.

In one embodiment, the handling layer is formed using a continuous mixing process such as by mixing the ingredients of the handling layer in an extruder or feeding the mixed ingredients as a solid, semi-solid or liquid to the extruder. In such an embodiment, the components of the handling layer or the material of the handling layer can be fed into an extruder at various different locations along the length of the extruder. Then, one or more screws of the extruder typically rotate and intermix and/or melt the ingredient of the handling layer such that the layer can be emitted as a layer from the extruder.

In one preferred embodiment, the material of the handling layer is provided (e.g., extruded) as a layer and then stretched to thin the layer and achieve a desired thickness of the handling layer. One exemplary technique for stretching the layer include extrusion of the handling layer onto a conveyor belt with the conveyor belt traveling at a rate that is faster than the rate at which the handling layer (i.e., the extrudate) leave the extruder. It is also possible, however, to use a die (e.g., an extrusion die) that emits a layer of a desired thickness to be the handling layer without subsequent stretching.

Generally, the thickness of the handling layer can vary depending upon the sizes of the masses of adhesive material to which the layer is applied and depending upon other factors as well. In preferred embodiments, the thickness (t), as shown in FIG. 1, of substantially (e.g., at least 90%) of the handling layer is at least about 0.0127 mm, although possibly less, more typically at least about 0.0254 mm and even possibly at least about 0.050 mm, and is typically less than about 2.54 mm, although possible more, more typically less than about 0.508 mm, still more typically less than about 0.254 mm and even still more typically less than about 0.127 mm and yet even more typically less than about 0.050 mm. Regardless of the thickness of the handling layer, it is typically desirable for the layer to have a % elongation prior to failure of less than about 200%, although possibly higher, more typically less than about 100% and still more typically less than about 50% or 30%.

Once formed, the handling layer is typically applied to an adhesive mass. The handling layer is typically layered upon a surface of the mass of adhesive material to form adhesive parts. For example, the handling layer could be co-extruded with the mass of adhesive material and continuously layered upon the mass. As an alternative, the handling layer could be formed and rolled and then unrolled as it is applied to the mass (e.g., layer) of adhesive material. In each of these scenarios, the mass of adhesive material and the handling layer would need to be subsequently cut to form adhesive parts (e.g., a strip or mass of adhesive material with a handling layer disposed thereon). It is also contemplated, however, that parts may formed by pre-forming of the mass of adhesive material into multiple masses (e.g., strips) and layering a pre-formed (e.g. pre-cut and/or pre-sized) handling layer to the masses. Still further, it is contemplated that the skilled artisan will be able to determine additional manners of forming parts within the scope of the present invention.

With reference to FIG. 1, there is an example of a part 10 formed in accordance with the present invention. As shown, the part 10 includes a handling layer shown as a film 12 that overlays a surface 14 of a mass of adhesive material shown as a strip 16.

Adhesive Material

The adhesive material may have a formulation that includes or is based upon one or more polymers that make up a polymeric base material. The polymeric base material can include epoxy resin, urethane, phenoxy resin, acrylate, acetate, ethylene polymer (e.g., copolymer), elastomer, a combination thereof or the like. It shall be recognized that, depending upon the application, a number of baffling, sealing, structural reinforcing, adhesive (e.g., for structural bonding and/or adhesion) or other materials, which may be expandable (e.g., foamable to form structural or sealing foams) or non-expandable, may be formulated in accordance with the present invention.

A typical material includes the polymeric base material which, when compounded with appropriate ingredients (typically a blowing a curing agent or both), activates (e.g., expands, foams, softens, cures, cross-links or a combination thereof) in a reliable and predictable manner upon the application of heat or the occurrence of a particular ambient condition. From a chemical standpoint for a thermally-activated material, which may be structural, sealing or acoustical, can be initially processed as a flowable material before curing, and upon curing, the material will typically cross-link making the material incapable of further flow.

The adhesive material of the present invention has been found particularly useful for applications including sealing and/or structural reinforcement and/or adhesion (e.g., structural bonding and/or adhesion). Generally, the activatable material may expand (e.g., foam) to at least about 101%, at least about 300%, at least about 500%, at least about 800%, at least about 1100%, at least about 1500%, at least about 2000%, at least about 2500% or at least about 3000% its original or unexpanded volume. For structural applications, expansion of the adhesive material is typically small if there is any expansion at all. Typically, an adhesive structural material of the present invention might expand, due to foaming, to a volume that is about 101% to about 450% of the volume of the material prior to expansion. A sealing adhesive material might expand to a volume that is about 500% to about 4000% of the volume of the material prior to expansion (e.g., foaming). Of course higher or lower expansion levels are within the scope of the present invention unless otherwise specifically stated.

The thickness ($t_1$) of the adhesive layer, as shown in FIG. 1, can vary fairly significantly and can be greater or smaller than the thickness of the handling layer, unless otherwise specifically stated. In preferred embodiments, the thickness ($t_1$) of the adhesive material is typically at least about 5× (5 times), more typically at least at least about 15×, still more typically at least about 25× and even possibly at least about 40× the thickness ($t_1$) of the handling layer.

In applications where the adhesive material is a heat activated material, an important consideration involved with the selection and formulation of the material is the temperature at which a material cures and, if expandable, the temperature of expansion. Typically, the material becomes reactive (cures, expands or both) at higher processing temperatures, such as those encountered in an automobile assembly plant, when the material is processed along with the automobile components at elevated temperatures or at higher applied energy levels, e.g., during paint curing steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher.

The handling layer has been found to be particularly useful for use with structural adhesive materials that are based upon epoxy chemistry. As such, the adhesive material of the present invention can include any of the epoxy resin, epoxy/elastomer adduct, curing agent, blowing agent, filler or other ingredients discussed in relation to the handling layer. As yet another example, certain adhesive materials formed in accordance with the present invention have exhibited post-activation tensile modulus greater than about 15 MPa, more typically greater than about 200 MPa and even possibly greater than about 350 MPa. Calculation of such tensile modulus is preferably calculated according to ASTM D 638. Examples of suitable materials for the adhesive material are disclosed in U.S. Pat. Nos. 6,846,559; 6,811,864 and U.S. Patent Publication 2004/0221953, all of which are incorporated herein by reference for all purposes.

It is understood that the film of the present invention can be used with a variety of adhesive materials, however, in one preferred exemplary embodiment, the adhesive material can includes any combination of two, three, four, more or even all of the following: epoxy resin, flexibilizer, additional polymer (e.g., phenoxy resin), impact modifier, blowing agent, curing agent, filler and/or one or more additives. The epoxy resin can be any one or a combination of those discussed herein with relation to the handling film or can be another single or mixture of epoxy resins. When used, the epoxy resin is typically between about 2% and 70% and even more typically between about 15% and about 40% by weight of the adhesive material. The flexibilizer can be any one or a combination of polymers that are amine modified, epoxy modified or both such as epoxidized polysulfides, epoxy-dimer acid elastomer amine or epoxy terminated polyethers, combinations thereof or the like. When present, the flexibilizer is typically at least 5%, more typically at least 17% and even possibly at least 25% by weight of the adhesive material but is typically less than 60%, more typically less than 45% and even possibly less than 35% by weight of the adhesive material, although higher and lower values may also be possible unless otherwise stated. The additional polymer can include one or a combination of polymers, but typically includes a substantial portion or substantially entirely phenoxy resin which may be modified with amine or epoxy. When present, the additional polymer is typically about 0.1% to about 50% and more preferably about 1% to about 20% by weight of the adhesive material. The impact modifier can be selected from a variety of modifiers but preferably includes or is substantially entirely composed of a core/shell polymer such as those discussed herein with relation to the handling layer or otherwise. It is generally preferable for the impact modifier to be at least 4%, more typically at least 7%, even more typically at least 10%, still more typically at least 13% and even still more typically at least 20% by weight of the adhesive material and also preferable for the impact modifier to be less than 70%, more typically less than 40% an even more typically less than 30% by weight of the adhesive material, although higher or lower amounts may be used in particular embodiments. Curing agents, blowing agent, fillers and other materials for the adhesive material may be any of those discussed herein with relation to the handling layer or otherwise selected and may be used in amounts that will depend on the expansion, amount of cure or otherwise as desired. It is also contemplated that curing agent and blowing agent accelerators may also be employed in the adhesive material. Further detail about such a preferred adhesive material can be found in commonly owned U.S. Patent Application Ser. No. 60/948,765 titled "Toughened Adhesive Material", filed Jul. 10, 2007, which is incorporated herein by reference for all purposes.

Other Additives

Other additives (e.g., polymers, agents or performance modifiers) may also be included in the adhesive material or the handling layer as desired, including but not limited to a UV resistant agent, a flame retardant, an impact modifier, a heat stabilizer, a UV photoinitiator, a colorant, a processing aid, a lubricant, a reinforcement (e.g., chopped or continuous glass, ceramic, aramid (e.g., aramid fiber and/or pulp), or carbon fiber or the like).

The adhesive material or the handling layer can also include core/shell impact modifier. Examples of core/shell impact modifier include, without limitation, core-shell graft copolymers where harder and/or higher glass transition temperature monomers or polymers, such as styrene, acrylonitrile or methyl methacrylate, are grafted onto cores made from polymers of soft or elastomeric containing compounds such as butadiene or butyl acrylate. U.S. Pat. No. 3,985,703, which is herein incorporated by reference, describes useful core-shell polymers, the cores of which are made from butyl acrylate but can be based on ethyl isobutyl, 2-ethylhexel or other alkyl acrylates or mixtures thereof. The core polymer, may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

The adhesive material or the handling layer can also include additional polymeric materials which can include a variety of different polymers, such as thermoplastics, elastomers, plastomers combinations thereof or the like. For example, and without limitation, polymers that might be appropriately incorporated into the adhesive material or handling layer include, without limitation, halogenated polymers, polycarbonates, polyketones, urethanes, phenoxy resin (e.g., thermoplastic polyethers), polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly (ethyleneimine), polyester, polyurethane, polysiloxane, polyether, polyphosphazine, polyamide, polyimide, polyisobutylene, polyacrylonitrile, poly(vinyl chloride), poly (methyl methacrylate), poly(vinyl acetate), poly(vinylidene chloride), polytetrafluoroethylene, polyisoprene, polyacrylamide, polyacrylic acid, polymethacrylate. One preferred thermoplastic polymer is a copolymer of polyvinyl chloride and vinyl acetate.

Preferred thermoplastic polymers for the handling layer, the adhesive material or both such as polyamide, polyvinyl chloride, polyethylene or polypropylene and/or copolymers including such thermoplastic polymers will typically exhibit one or both of the following properties: glass transition temperature ($T_g$) between about 50° C. and about 150° C. and more typically between about 70° C. and about 120° C.; and a solubility parameter of between about 15 and about 32 $J^{1/2}/cm^{3/2}$ and more typically between about 18 and 26 $J^{1/2}/cm^{3/2}$. Such solubility parameter can be an indication of the miscibility of the thermoplastic polymer in an epoxy resin (e.g., a solid epoxy resin).

Examples of suitable formulations for the handling layer are provided in Table I, II, III below:

TABLE I

| Ingredients | Formula A Wt. Percents | Formula B Wt. Percents | Formula C Wt. Percents | Formula D Wt. Percents |
| --- | --- | --- | --- | --- |
| Solid Epoxy Resin | 33.01 | 26.34 | 33.34 | 26.47 |
| Multifunctional Solid Epoxy Resin Methacrylate/Glycidyl Methacrylate | 16.49 | 13.16 | 16.66 | 7.21 |
| Epoxy/Elastomer Adduct (solid) | 11.00 | 8.78 | 11.11 | 19.25 |
| Nitrile Elastomer | 22.01 | 17.57 | 22.23 | 9.63 |
| Core/Shell Toughener | | | | 9.63 |
| Phenoxy Resin | | | | |
| EVA | | | | |
| EMA | | | | |
| Conductive Filler | | | | 9.96 |
| Talc | | 20.00 | | |
| Blowing Agent | | | | |
| Curing Agent | 1.00 | 0.99 | | 2.71 |
| Curing Agent Accelerator | | | | 0.72 |
| Polyvinyl Chloride or PVC copolymer | 16.49 | 13.16 | 16.66 | 14.42 |
| Antioxidant | | | | |

TABLE II

| Ingredients | Formula E Wt. Percents | Formula F Wt. Percents | Formula G Wt. Percents | Formula H Wt. Percents |
| --- | --- | --- | --- | --- |
| Solid Epoxy Resin | 33.34 | 22.01 | 31.80 | 22.01 |
| Multifunctional Solid Epoxy Resin Methacrylate/Glycidyl Methacrylate | 16.66 | 16.49 | 6.83 | 16.49 |
| | | | | 11.00 |
| Epoxy/Elastomer Adduct (solid) | 11.11 | 11.00 | 31.80 | 11.00 |
| Nitrile Elastomer | 22.23 | 22.01 | 15.86 | |
| Core/Shell Toughener | | 11.00 | | 22.01 |
| Phenoxy Resin | | | | |
| EVA | 16.66 | | | |
| EMA | | | | |
| Conductive Filler | | | 9.45 | |
| Talc | | | | |
| Blowing Agent | | | | |
| Curing Agent | | 1.00 | 3.23 | 1.00 |
| Curing Agent Accelerator | | | 1.03 | |
| Polyvinyl Chloride or PVC copolymer | | | | 16.49 |
| Antioxidant | | | | |

TABLE III

| Ingredients | Formula I Wt. Percents | Formula J Wt. Percents | Formula K Wt. Percents | Formula L Wt. Percents |
| --- | --- | --- | --- | --- |
| Solid Epoxy Resin | 33.02 | 24.38 | 22.70 | 29.62 |
| Multifunctional Solid Epoxy Resin Methacrylate/Glycidyl Methacrylate | 16.49 | 6.64 | 13.74 | 8.07 |
| Epoxy/Elastomer Adduct (solid) | 11.00 | 24.79 | 16.04 | 21.56 |
| Nitrile Elastomer | 22.01 | 8.87 | 18.34 | 10.78 |
| Core/Shell Toughener | | 8.87 | | 10.78 |
| Phenoxy Resin | | | 11.68 | |
| EVA | | | | |
| EMA | 16.48 | | | |
| Conductive Filler | | 9.17 | 15.0 | |
| Talc | | | | |
| Blowing Agent | | | | |
| Curing Agent | 1.00 | 2.49 | 2.50 | 3.03 |
| Curing Agent Accelerator | | 1.00 | | |
| Polyvinyl Chloride or PVC copolymer | | 13.29 | | 16.16 |
| Antioxidant | | 0.50 | | |

It should be understood that various ingredients may be substituted, added or removed from the above formulations without departing from the scope of the present invention. Moreover, it is contemplated that the weight percentages of the above ingredients may vary up to or greater than ±5%, ±10%, ±25% or ±50%.

Figures 2, 3:
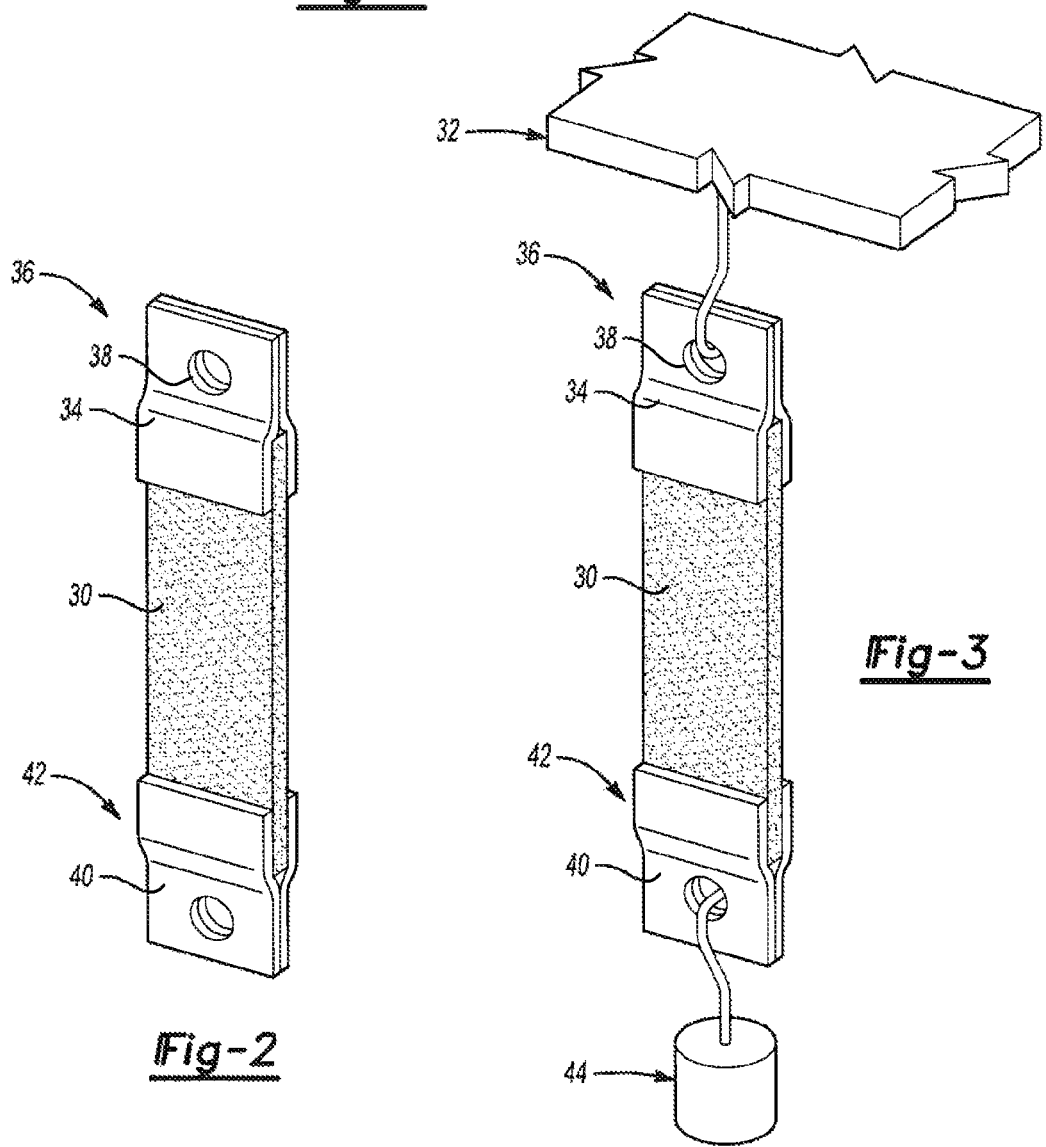
FIGS. 2 and 3 illustrate a test method suitable for characterization of handling layers according to an aspect of the present invention.

It is often desirable that the handling layer resist stretching. One preferred testing technique for gauging or measuring stretch resistance is performed using a Shear Bar testing apparatus, such as that made by Cheminstruments, Inc., 510 Commercial Drive, Fairfield, Ohio. For the purpose of measuring the stretch-resistance of the present invention and with reference to FIG. 2, a strip of handling layer shown as a rectangular film 30 that is 12.5 mm wide and 63.5 mm in length is attached to the Shear Bar test fixture 32 using a piece of masking tape 34 wound around one end 36 of the handling film 30, with a hole 38 punched in the masking tape using a standard paper punch. Masking tape 40 is similarly applied to the other end 42 of the handling film 30 for the purpose of attaching a weight 44 to the film 30 after the film 30 is attached to the Shear Bar test fixture 32. In such a configuration, the weight 44 weighs 25 grams and the handling film 30 is 0.05 mm thick. Under these test conditions, it is desirable that the handling film 30 maintain its dimension so as to not undergo failure (e.g., by the film breaking into two parts) that causes the weight 44 to drop away from the shear bar test fixture 32 and/or to the bottom of the Shear Bar test apparatus, for at least 3 hours, more preferably for more than 8 hours, and most preferably for more than 24 hours.

To make it easier to test such thin films such as the film 30 shown, it is sometimes useful to apply the handling film of the prescribed thickness to a soft adhesive material, approximately 1 mm thick and of the same dimensions of the handling film, and conduct the test on the laminated structure. In order to use the laminated construction, it is required that the failure time of the adhesive alone under application of the 25 gram weight be one hour or less in order for the test result to be valid for the characterization of the handling film. One exemplary soft adhesive material suitable for use in the laminated construction is L-8100, commercially available from L&L Products, Romeo, Mich. Such soft adhesive material can provide for greater ease in handling of the film and attaching of the masking tape to the film.

FIG. 1 illustrates the exemplary adhesive part 10 that includes the adhesive material 16 and the handling layer 12 applied thereto. Generally, the adhesive part 10 can be provided as a strip that is layered upon a release substrate (e.g., release paper). It will be recognized that an individual or automated system can contact the handling layer 12 of the part 10 and remove the part 10 from a release substrate. Thereafter, the part 10 can be applied to a surface of a member or substrate of an article of manufacture by contacting the adhesive material 16 to that surface and then releasing the part 10. This application of the part 10 is particularly effective if the handling layer 12 is substantially non-tacky and the adhesive material is tacky. Tacky adhesive materials can typically, prior to activation and once contacted with a substrate, hold the adhesive material and the handling layer in place and can, in preferred embodiments support the adhesive material and the handling material when contacted with a substantially vertical surface of a substrate.

The members to which the adhesive material or part are applied may be configured for installation within a variety of articles of manufacture as discussed. In one preferred embodiment, the adhesive material or part is applied to a member that is assembled is to be assembled to an automotive vehicle. Members that may be assembled to an automotive vehicle can include, without limitation, body members (e.g., inner or outer quarter panels, inner or outer panels of a vehicle door, hood, roof, closure panel, a bumper, a pillar, combinations thereof or the like), frame members (e.g., frame rails), engine or chassis components or other members. Other members, which may be assembled to an automotive vehicle include carrier members, which may be used to form baffles, reinforcement members, combinations thereof or the like.

Upon application to a member and thereafter, it may be desirable for the adhesive material or parts to exhibit desired characteristics to allow for further processing or assembly. For example, it may be desirable for the adhesive material or parts to be elastic such that, if the part is deformed or stretched, the material can at least partially regain its original configuration. In one embodiment, it is preferable for the adhesive material to be relatively easily displaceable such that it causes minimal interference with further processing or assembly steps (e.g., a welding step). Such displaceable materials as described herein can be particularly suitable for allowing weld-through. Thus, in one embodiment of the present invention, it is contemplated that the adhesive material or parts are applied to a portion of a member and the portion of the member is subsequently welded. Generally, the member may be welded to another member or welding may be carrier out on the single member. Moreover, the welding may take place prior to, during or after assembly of the member to its article of manufacture (e.g., an automotive vehicle). The adhesive material may be particularly suited to be displaced by electrical resistance welding electrodes.

After application, the adhesive material, the handling layer or both are preferably activated to cure (e.g., crosslink), expand (e.g., foam) or both as has been described herein. Such activation may occur before welding, when a welding step is employed, but typically occurs thereafter. When the members are part of an automotive vehicle (e.g., body or frame components), the activation typically occurs during paint or coating processing steps (e.g., in an e-coat oven).

If the adhesive parts have been applied to a carrier member to form a baffle, a reinforcement member, a seal or the like, the carrier member with the parts thereon is typically inserted within a cavity of a structure of an article of manufacture (e.g., an automotive vehicle). After insertion, the adhesive material the handling layer or both are typically activated to expand, cure or both thereby adhering the carrier to the structure (e.g., within a cavity thereof) of the article for forming a baffling, sealing or reinforcement system. Alternatively, if the adhesive material or adhesive part has been applied to other members of an article of manufacture (e.g., members of an automotive vehicle) as discussed herein, the adhesive material or part may be activated to expand, cure or both and form a seal, a reinforcement, a baffle, a sound absorption system, a combination thereof or the like.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of applying an adhesive film material to a member, the method comprising:
   providing the adhesive film material, the adhesive film material including:
   i. an epoxy resin, the epoxy resin being solid;
   ii. an epoxy/elastomer adduct, a substantial portion of the adduct being solid;
   iii. from about 1% to about 18% by weight of an elastomer that includes butadiene acrylonitrile rubber;
   iv. at least about 11% by weight of a methacrylate/glycidyl methacrylate;
   v. a core/shell polymer, wherein the core/shell polymer and at least a portion of the epoxy resin, the epoxy/elastomer adduct, or both are mixed and fed to an extruder in solid form without any liquid present;
   applying the adhesive film material to a surface of the member; and
   activating the adhesive film material to cure and/or crosslink the adhesive film material;

wherein the adhesive film material exhibits a stretch resistance when tested on a shear bar testing apparatus of at least 8 hours.

2. A method as in claim 1 wherein the adhesive film material is expandable, thermosettable or both at a temperature of about 93.33° C. to 204.44° C.

3. A method as in claim 1 wherein the member is part of an automotive vehicle.

4. A method as in claim 1 wherein the adhesive film material includes a conductive material.

5. A method as in claim 1 further comprising welding the member wherein the step of welding the member includes displacing at least a portion of the adhesive film material.

6. A method as in claim 1 wherein at least 90% by weight of all epoxy resin and all the epoxy/elastomer adduct are solid at 23° C.

7. A method as in claim 1 wherein the adhesive film further includes a thermoplastic polymer.

8. A method as in claim 1 wherein the adhesive film material exhibits a tensile modulus of at least 15 MPa after activation.

9. A method of applying an adhesive film material to a member for providing sealing, structural adhesion, baffling, reinforcement or a combination thereof to the member, the method comprising:
  providing the adhesive film material, the adhesive film material including:
  i. an epoxy resin, the epoxy resin being solid;
  ii. an epoxy/elastomer adduct, a substantial portion of the adduct being solid;
  iii. a curing agent; and
  iv. from about 1% to about 18% by weight of an elastomer that includes butadiene acrylonitrile rubber;
  v. at least about 11% by weight of a methacrylate/glycidyl methacrylate;
  vi. a core/shell polymer, wherein the core/shell polymer and at least a portion of the epoxy resin, the epoxy/elastomer adduct, or both are mixed and fed to an extruder in solid form without any liquid present;
  applying the adhesive film material to a surface of the member, the member being part of an automotive vehicle; and
  activating the adhesive film material during automotive paint or coating processing steps to cure and/or crosslink the adhesive film material;
  wherein the adhesive film material exhibits a stretch resistance when tested on a shear bar testing apparatus of at least 8 hours.

10. A method as in claim 9 wherein the adhesive film material exhibits a tensile modulus of at least 15 MPa after activation.

11. A method as in claim 9 wherein the adhesive film material is expandable, thermosettable or both at a temperature of about 93.33° C. to 204.44° C.

12. A method as in claim 9 wherein the adhesive film material includes a conductive material.

13. A method as in claim 9 further comprising welding the member wherein the step of welding the member includes displacing at least a portion of the adhesive film material.

14. A method as in claim 9 wherein at least 90% by weight of all epoxy resin and all the epoxy/elastomer adduct are solid at 23° C.

15. A method as in claim 9 wherein the adhesive film material further includes a thermoplastic polymer.

16. A method of applying an adhesive film material to a member for providing sealing, structural adhesion, baffling, reinforcement or a combination thereof to the member, the method comprising:
  providing the adhesive film material, the adhesive film material including:
  i. an epoxy resin;
  ii. at least 30% by weight of an epoxy/elastomer adduct;
  iii. a curing agent;
  iv. from about 1% to about 18% by weight of an elastomer that includes butadiene acrylonitrile rubber;
  v. at least about 11% by weight of a methacrylate/glycidyl methacrylate;
  vi. a core/shell polymer, wherein the core/shell polymer and at least a portion of the epoxy resin, the epoxy/elastomer adduct, or both are mixed and fed to an extruder in solid form without any liquid present;
  applying the adhesive film material to a surface of the member, the member being part of an automotive vehicle; and
  activating the adhesive film material during automotive paint or coating processing steps to cure and/or crosslink the adhesive film material;
  wherein the adhesive film material exhibits a stretch resistance when tested on a shear bar testing apparatus of at least 8 hours.

17. A method as in claim 16 wherein:
  i. the adhesive film material exhibits a tensile modulus of at least 15 MPa after activation;
  ii. the adhesive film material is expandable, thermosettable or both at a temperature of about 93.33° C. to 204.44° C.; and
  iii. at least 90% by weight of all epoxy resin and all he epoxy/elastomer adduct are solid at 23° C.

18. A method as in claim 17 further comprising welding the member wherein the step of welding the member includes displacing at least a portion of the adhesive film material wherein:
  i. the adhesive film material includes a conductive material;
  ii. the adhesive film material further includes a thermoplastic polymer.

19. The method of claim 1, wherein the adhesive film material includes at least about 5% by weight of a multifunctional solid epoxy resin with a functionality of greater than about 2.

* * * * *